C. A. HOLCOMBE.
Weighing Apparatus.

No. 214,915. Patented April 29, 1879.

WITNESSES
W. Bradford
J. P. Berthrong

INVENTOR
C. A. Holcombe.
per Edson Bros,
Attorneys

UNITED STATES PATENT OFFICE.

CLIFFORD A. HOLCOMBE, OF LITTLE SIOUX, IOWA.

IMPROVEMENT IN WEIGHING APPARATUS.

Specification forming part of Letters Patent No. 214,915, dated April 29, 1879; application filed May 25, 1878.

*To all whom it may concern:*

Be it known that I, CLIFFORD A. HOLCOMBE, of Little Sioux, in the county of Harrison and State of Iowa, have invented certain new and useful Improvements in Weighing Apparatus; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
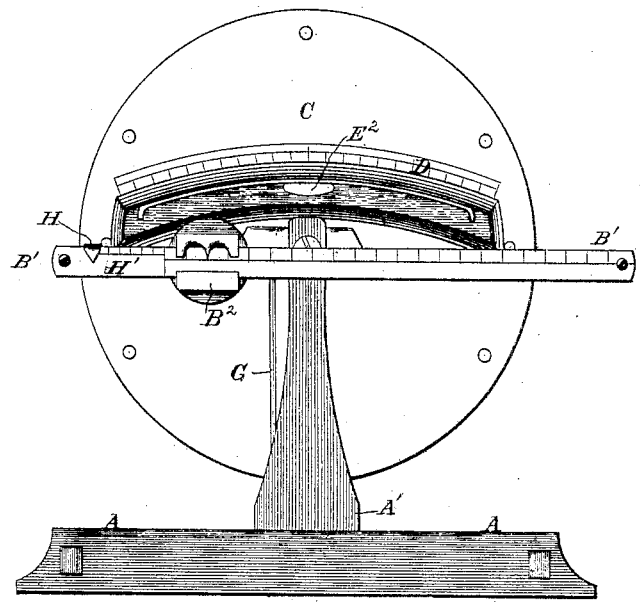
Figure 2:
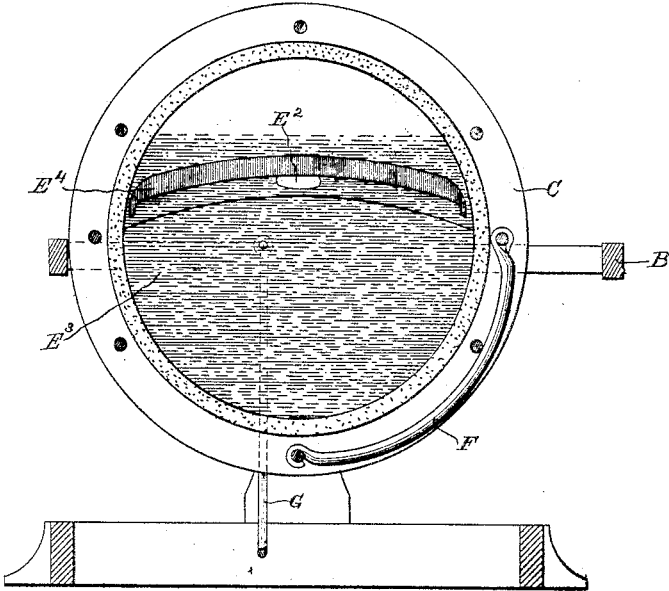
Figure 3:
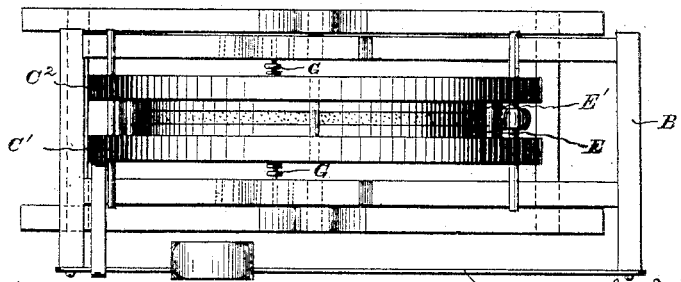

Figure 1 is an elevation, showing the circular fluid and air chamber, the graduated scale for indicating the weight by the air-bubble, and a movable weight attached to the frame for determining the tare of articles to be weighed. Fig. 2 is a sectional elevation, showing the circular chamber, the packing placed between the sections thereof, the fluid and air chamber, the graduated scale for indicating the weight, an extraneous weight attached to circular chamber, and a yoke for connecting the apparatus to a platform or hopper; and Fig. 3 is a top or plan view, showing the parts above enumerated, and also the sliding frame upon which the circular chamber rests.

Corresponding letters denote like parts in all of the figures.

This invention relates to apparatus for weighing various kinds of substances, whether in large or small quantities.

It consists in the use for that purpose of a circular chamber, or its equivalent, partially filled with mercury, alcohol, or other fluid substance, and partially filled with air, having upon it a graduated scale, which, in a certain position of the chamber, correctly indicates the weight of any substance that it may become desirable to determine; and it further consists in the use of a sliding circular or equivalently constructed fluid and air chamber, by which the tare of any substance to be weighed may be ascertained, and in the combination and arrangement of certain of its parts, as will be more fully explained hereinafter.

In constructing devices of this type I use any suitable form of support, A, to which standards A' are attached, the upper ends of which are to be prepared for the reception of knife-edged or other suitable projections from the circular chamber or from the frame upon which it rests, so that it may oscillate in said standards with the least possible amount of friction. A frame, B, is placed between or upon the upper ends of the standards A' A', and is connected therewith by the knife-edged bearings above alluded to in such a manner that its ends are free to oscillate or vibrate through the arc of a circle. To the ends of this frame a graduated scale, $B^1$, is secured, the division-marks of which may be arranged to show ounces, pounds, or hundreds of pounds, according to the size of the device; or they may show all of these quantities. Upon the scale $B^1$ there is placed a sliding weight, $B^2$, this portion of the apparatus being designed as one means of indicating the tare of the substance to be weighed; but when there is no tare or extraneous matter to be taken account of it need not be used, as it is not necessary in ascertaining the net weight of any substance.

For ascertaining the net weight, and as a further means of determining the tare, there is provided a circular disk, C, which consists of two plates of metal, $C^1$ and $C^2$, which may be drawn toward each other and held in position by means of bolts or screws. These disks are provided with slots or apertures D, the upper or lower edges, or both, of which are to be graduated to a scale of pounds or ounces, or both, for a purpose soon to be described. Between the metal disks $C^1$ and $C^2$ there are placed two other disks, E $E^1$, which are made of glass, in order that the position of an air-bubble, $E^2$, may be readily seen through them. Between these disks of glass some suitable material is placed for the purpose of forming a packing, and thus, in conjunction with the glass disks, forming a chamber, $E^3$, as shown in Fig. 2, which chamber is, when the instrument is ready for use, to be partially filled with mercury, alcohol, or some other suitable fluid and hermetically sealed up. Within the chamber $E^3$ there is placed a curved metallic guard, $E^4$, which is of the form shown in Fig. 2, and of such length as not to come in contact at its ends with the packing between the disks, but only to leave a small space between its ends and such packing, the object being to have a space there for the passage of the fluid when the chamber is oscillated in determining weights. The width of this guard is to be such that its sides will rest against the glass disks, and thus prevent the passage of the fluid at these points.

It will be found that in filling the chamber $E^3$ with the fluid up to about the point indicated by the short lines in Fig. 2, a small portion of the air contained in said chamber will remain under the guard, and this is to be used as indicating the weight placed upon the instrument. In the event of the disk being rotated to such an extent as to bring this air-bubble to the extreme end of the guard, a downward projection thereon will prevent said bubble from passing out of its place and into the chamber above. The efficiency of this instrument will, to some extent, depend upon the fact that that portion thereof which is below its center, or the point where it rests upon the standards, is of greater weight than is that portion which is above such points, and this result is partially obtained by the use of the fluid in the lower portion of the chamber; but as an additional means for resisting the oscillation of the chamber an extraneous weight, F, may be added. As a means of connecting the articles to be weighed with the instrument, a stirrup, G, is attached to the oscillating frame B at a point removed some distance from those which support it upon the standards. The points at which this stirrup is connected to the oscillating frame will determine the direction in which such frame and the chamber will move in giving the weight of an article, and by carrying them to a greater or less distance from the bearing-points of such frame the instrument may be made to indicate ounces, pounds, hundreds of pounds, or tons, or all of these, without changing the scale upon the chamber.

As furnishing a method of determining the tare of an article, or the gross and net weight of the same, the circular chamber which contains the fluid and air is made to move upon the oscillating frame B, it being supported thereon by means of rods of metal, or in any other manner that will leave it free to move longitudinally, which movement may be caused by means of a screw passed through one end of the frame and connected to one of the metal disks of the chamber.

I desire it to be understood that I do not confine myself to the form of the fluid and air chamber, as it is apparent that it may be varied without at all varying the result produced by it—as, for instance, it may consist of two curved pipes extending upward from its lower portion, said pipes communicating at their upper ends, and thus forming an air-space at that point, and at the same time conduits for the passage of the fluid when the chamber is oscillated.

The operation of this instrument will be as follows: The parts having been constructed substantially as shown and described, and the chamber $E^3$ filled with a fluid to about the point indicated in Fig. 2, if the parts are so adjusted as to cause the air-bubble $E^2$ to be in the center of the chamber, as shown in the drawings, a weight of any kind is attached to the stirrup G, the end of the oscillating frame which is nearest to the point at which said stirrup is attached will be carried downward, which will cause the air-bubble to travel toward the opposite end of the slots or apertures D, and the weight of the article will be indicated by the position of said air-bubble with reference to the marks on the scale, and this will be accomplished without the use of weights or other extraneous parts.

When articles are to be weighed a portion of which is to be paid for by the pound and a portion not to be thus paid for, such as tubs of butter, boxes of cheese, loads of hay or coal, and various other commodities, and it is desirable to determine the exact proportion of each, the tub, box, or vehicle may be placed upon a platform attached to the stirrup G, and the weight $B^2$ moved upon the scale $B^1$ until the air-bubble is brought to the zero-point upon its scale, when the material to be sold may be added, and the number of pounds and parts of pounds there indicated will be the net weight of the articles.

If at any time the scale $B^1$ proves to be too short or the weight $B^2$ placed thereon too light to give the tare, then the chamber $E^3$ may be moved upon the frame B until the bubble $E^2$ stands at the zero-point on its scale, which will cause the tare to be indicated on scale $B^1$ at the point where weight $B^2$ stands, and at the point indicated by the pointer H on a scale, H′, marked on the end of scale $B^1$, and these two amounts added together will give the total tare, and then by adding the substance to be weighed its net weight will be indicated by the air-bubble and its scale.

Owing to the fact that there is an air-chamber above the fluid in the chamber $E^3$, it will be found that no difficulty will arise from the oscillations of the air-bubble in placing articles upon the platform; but the net weight will be promptly indicated.

Having thus described my invention, what I claim, and desire to secure by Letters Patent, is—

1. The fluid and air chamber, when made adjustable longitudinally with reference to its points of suspension, substantially as set forth.

2. The air-bubble guard, when constructed with downwardly-projecting ends for checking the movement of the air-bubble, substantially as set forth.

3. The combination of the plates $C^1$ $C^2$ E $E^1$, the latter having packing placed between them, and the guard $E^4$, the parts being arranged to operate substantially as and for the purpose specified.

4. The combination of the chamber $E^3$ and oscillating frame B, substantially as set forth, and for the purpose specified.

5. The combination of the chamber $E^3$, oscillating frame B, and fixed scale $B^1$, for determining the tare of an article to be weighed, substantially as set forth.

6. The combination of the chamber $E^3$, pointer or indicator H, and fixed scale, substantially as described, and for the purpose specified.

7. In combination with an oscillating frame in an instrument for determining the weight of different substances, a longitudinally-adjustable fluid and air chamber, $E^3$, and a longitudinally-adjustable stirrup for attaching the articles to be weighed to the instrument, substantially as and for the purpose specified.

8. The combination of the plates $C^1 C^2 E E^1$ and the guard $E^4$, the parts being arranged to operate as and for the purpose specified.

In testimony that I claim the foregoing as my own I hereunto affix my signature in presence of two witnesses.

C. A. HOLCOMBE.

Witnesses:
 S. T. FOX,
 GEO. F. STRAIGHT.